UNITED STATES PATENT OFFICE.

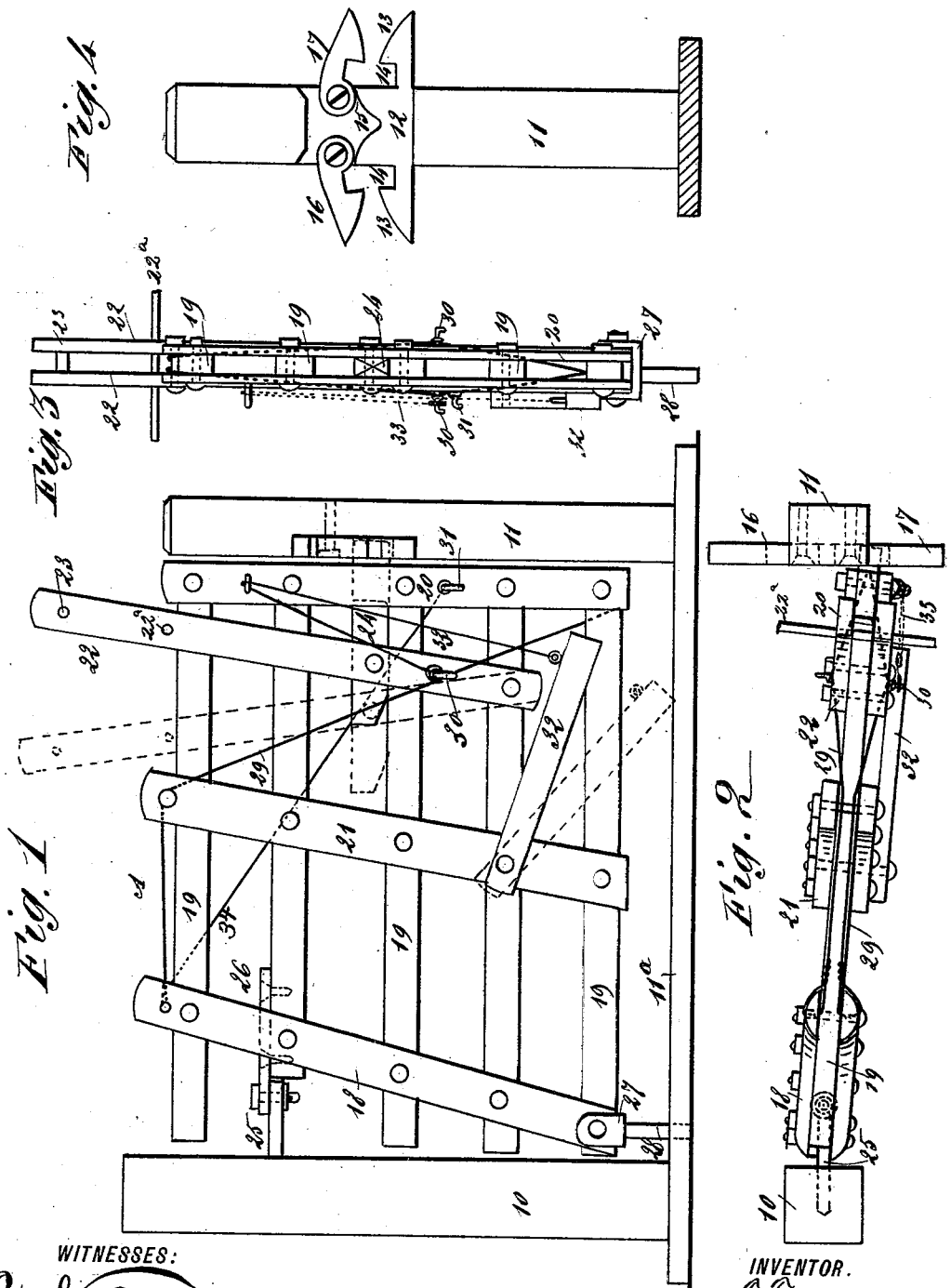

THOMAS TYSON, OF MOUND CITY, MISSOURI.

GATE.

SPECIFICATION forming part of Letters Patent No. 392,937, dated November 13, 1888.

Application filed June 4, 1888. Serial No. 276,014. (No model.)

*To all whom it may concern:*

Be it known that I, THOMAS TYSON, of Mound City, in the county of Holt and State of Missouri, have invented a new and useful Improvement in Gates, of which the following is a full, clear, and exact description.

My invention relates to an improvement in gates, and has for its object to provide a gate which will be simple in construction and readily manipulated and wherein the said gate may be adjusted vertically to clear any obstruction beneath the same, such as snow or ice.

The invention consists in the arrangement of the latch and the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of the gate. Fig. 2 is a plan view. Fig. 3 is an edge view, and Fig. 4 is a detail view of one gate-post with the catch attached.

In carrying out the invention heavy gate-posts 10 and 11 are employed, one gate-post, 11, being provided upon the inner face with a transverse catch-bar, 12, which bar is provided with outer inclined surfaces, 13, recesses 14, adjacent to said inclined surfaces, and upwardly-projecting spaced central lugs, 15, as best shown in Fig. 4. The said catch-bar is secured to the gate-post in a recess, whereby the outer surfaces of the two are essentially flush, and above the said catch-bar two pivotal catches, 16 and 17, are secured, each of the said catches being provided with inclined surfaces and recesses equivalent to the projecting members of the lower catch-bar. The said inclined and recessed surfaces of the several catches are made to oppose each other, as fully set forth in said Fig. 4.

The gate A is hinged to the post 10 at the upper end and held to turn in a base-piece, 11ª, in a manner which will be hereinafter fully set forth.

The gate consists of a rear inclined vertical bar, 18, which bar is divided longitudinally to receive the ends of a series of horizontal slats, 19, said slats being pivoted to the said bar 18 in any approved manner. In the further construction of the gate a front bar, 20, is provided, which bar is essentially vertical, also divided, and between the several sections of the said front bar the opposite ends of the several horizontal slats 19 are pivoted as in the rear. The several horizontal slats 19 are further stayed by a central longitudinally-divided bar, 21, in which said slats are pivoted, which central bar is slightly inclined from the base upward in the direction of the front.

A latch-standard, 22, consisting of two opposing strips, one situated at each side of the several horizontal strips, is pivoted to or near the bottom strip, and the several strips or standards extending upward are united at their upper ends by a suitable pin or bolt, 23. Centrally between the strips of the latch-standard 22 a latch, 24, is pivoted, which latch is adapted to project outward through the front vertical bars of the gate and engage the upper and lower catches, 12 and 17, as illustrated in Figs. 1 and 2. The latch-standard is provided with the handles 22ª.

In hinging the gate a horizontal strip, 25, is secured upon the inner side of the gate-post 10 at or near the top, or a suitable distance from the top, terminating in an eye, and to one of the upper strips of the gate a strap, 26, is secured, having an aperture in the outer end, which aperture in the strap is adapted to register with the eye in the strip 25, and the two are secured by means of a bolt, pintle, or other suitable device to constitute a hinge. The lower hinge of the gate consists of an essentially U-shaped body, 27, provided upon the under side with a vertical pintle, 28, which pintle is adapted to enter the base strip 11ª, as clearly shown in Fig. 1. By this mode of hanging the gate the said gate has a tendency when open to automatically close, as the weight is all thrown to the forward or free side of the same.

A wire rope or strand, 29, is attached to the upper end of the rear inclined gate bar or standard, 18—one strand or rope at each side—the same being adapted to pass over the upper pivotal bolt of the central vertical gate bar or standard and down in contact with a pin, 30, secured to each member of the latch-bar 22, at or near the base or pivotal point of the same, the said strand or rope being continued downward and secured to the lower horizontal strip, 19, of the gate in any approved or suitable manner.

The wire rope or strand 29 serves a dual purpose, as it not only tends to support the several horizontal strips of the gate, but also acts as a spring for the latch, since, when the latch-standard is carried rearward to open the gate which draws the latch 24 within the front standard or bar, 20, the wire rope or strand is pressed to the rearward, and when the latch-standard is released the rope or strand returning to its normal position throws the latch-standard, and consequently the latch, forward. Thus in operation, when it is desired to open the gate, the latch-standard 22 is carried to the rear, as aforesaid, depressing the strand or rope 29, which draws the latch 24 inward. The gate may now be swung open readily, and when the gate is released, after the passage of the party or operator through the gate-opening, the weight, being toward the front, will cause the gate to automatically close, and, as the wire rope or strand has thrown the latch outward, the said latch, as the gate closes, coming in contact with the outer member of the catch-bar 12 and one of the opposing pivotal catches 16 and 17, automatically locks, the pivotal catch giving way to the latch 24 and falling down in engagement with the same.

It will be observed that the gate may be opened from either side, as when the latch 24 is drawn inward by means of the latch-standard the gate is free to be swung in any desired direction, either to or from the operator. When snow or ice or other obstructions would prevent the gate from being manipulated when in its normal position, the difficulty may be obviated by attaching a rope or cord, 34, to a pin, 31, secured to the front standard, 20, of the gate. By carrying said cord upward to an engagement with the top of the rear standard or bar, 18, or to a connection with the top longitudinal slat, 19, and exerting a tension upon the cord the several horizontal slats may be carried upward at an inclination, thereby elevating the front of the gate. This operation is easily performed, owing to the several horizontal strips being pivoted to the respective vertical or inclined tying-standards.

To the central standard, 21, at or near the base, preferably upon one side, a bar, 32, is pivoted at one end, the other end being free. To the free end of the bar a rope or cord, 33, is secured, which rope or cord, passing through an eye upon the front standard, 20, is carried downward, terminating in a ring or other suitable or equivalent device adapted for engagement with the pin 30 upon the latch-standard, as clearly shown in Fig. 1. The object of this bar is to retain the gate in an open or partially-open position, when so desired, and is accomplished in this manner: After opening the gate in the manner aforesaid the desired distance, the ring is detached from the pin 30 and the free end of the bar 32 allowed to drop down in contact with the ground. The edge of said bar, burying itself in the ground, will hold the gate open until drawn upward and secured again, as shown in Fig. 1.

It will thus be observed that by means of the construction above set forth a gate is provided which may be readily opened by any one, and which will automatically close, and also wherein the gate may be held either fully open or partially open, as and when desired.

Having thus fully described my invention, what I claim as new, and desire to secure by Letters Patent, is—

1. The combination, with a gate, of a flexible brace, a pivoted latch-standard engaging the said flexible brace, and a horizontal latch pivoted to the said standard, substantially as and for the purpose set forth.

2. The combination, with a gate hinged to have a forward inclination, having horizontal slats pivoted in vertical and inclined standards, and a wire strand or rope secured at the front to the bottom horizontal strip and to the rear tying standard, of a latch-standard pivoted to one of the said horizontal strips, provided with a pin bearing upon the said wire rope or strand, and a latch horizontally pivoted in the said latch-standard, as and for the purpose specified.

3. The combination, with a gate hinged to have a forward inclination, consisting of a series of horizontal strips pivoted in inclined and vertical tying-standards, and a wire rope or strand secured to the lower horizontal strip at the front and to the rear tying standard at the top, of a latch-standard pivoted to one of the said horizontal strips, provided with a pin bearing upon said wire rope or strand, a latch pivoted horizontally in said latch-standard, a retaining-bar pivoted to a central vertical tying-standard, and means, substantially as shown and described, for manipulating the said retaining-bar, substantially as and for the purpose specified.

4. The combination, with a gate hinged to have a forward inclination, consisting of a forwardly-inclined rear standard, a similarly-inclined central standard, and a vertical front standard, and horizontal strips pivoted in said standards, and a wire rope or strand secured to the bottom horizontal strip at or near the front and to the top of the rear inclined standard, of a latch-bar pivoted to one of the horizontal strips at or near the bottom of the gate, pins secured to said latch-standard engaging the wire rope or strand, a latch-bar horizontally pivoted in said latch-standard, a retaining-bar pivoted to the central inclined standard, a rope leading from said retaining-bar upward through an eye secured to the front standard and engaging the pin upon the latch-standard, and a means, substantially as shown and described, for adjusting the gate vertically, as and for the purpose specified.

THOMAS TYSON.

Witnesses:
EDWARD HUGGINS,
JOHN P. LEWIS.